G. W. MYERS.
DIFFERENTIAL CLUTCH GEARING.
APPLICATION FILED JUNE 6, 1919. RENEWED DEC. 29, 1921.
1,406,211.
Patented Feb. 14, 1922.
4 SHEETS—SHEET 4.
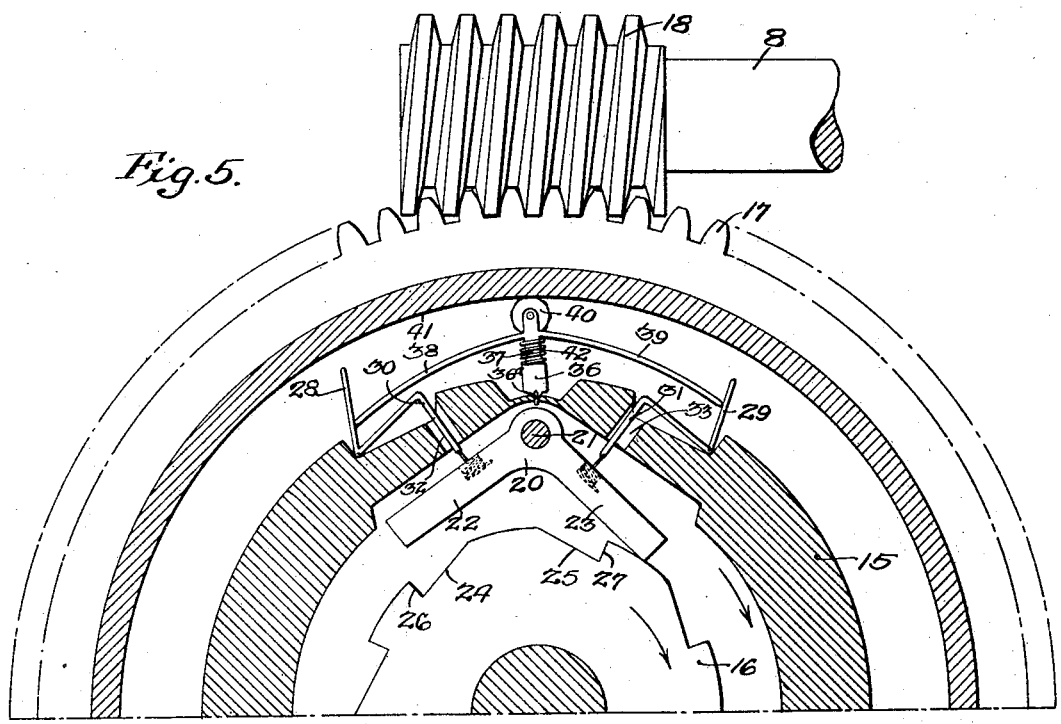
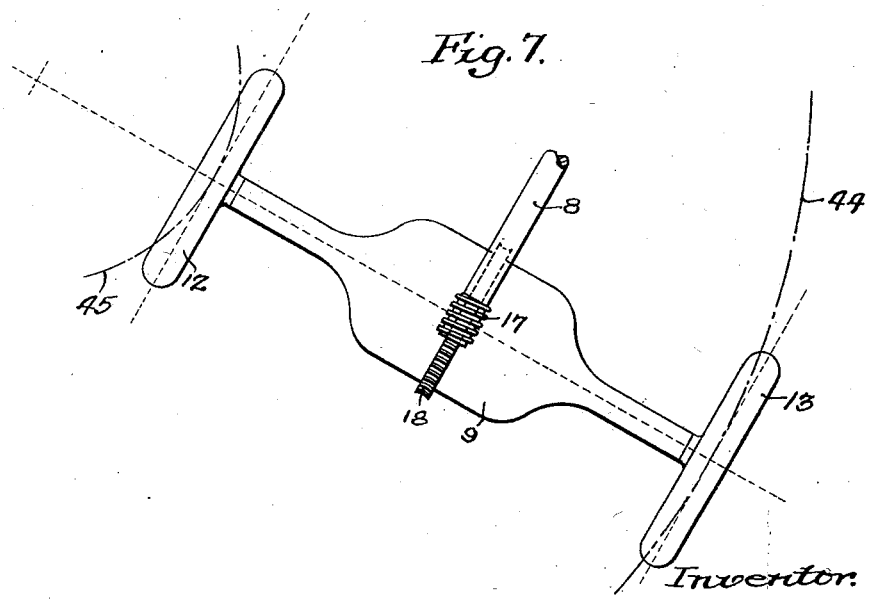
Witnesses.
Evelyn M. Brompton
Augustus B. Coppes
Inventor.
George W. Myers
by Joshua R. H. Potts
his Attorney.

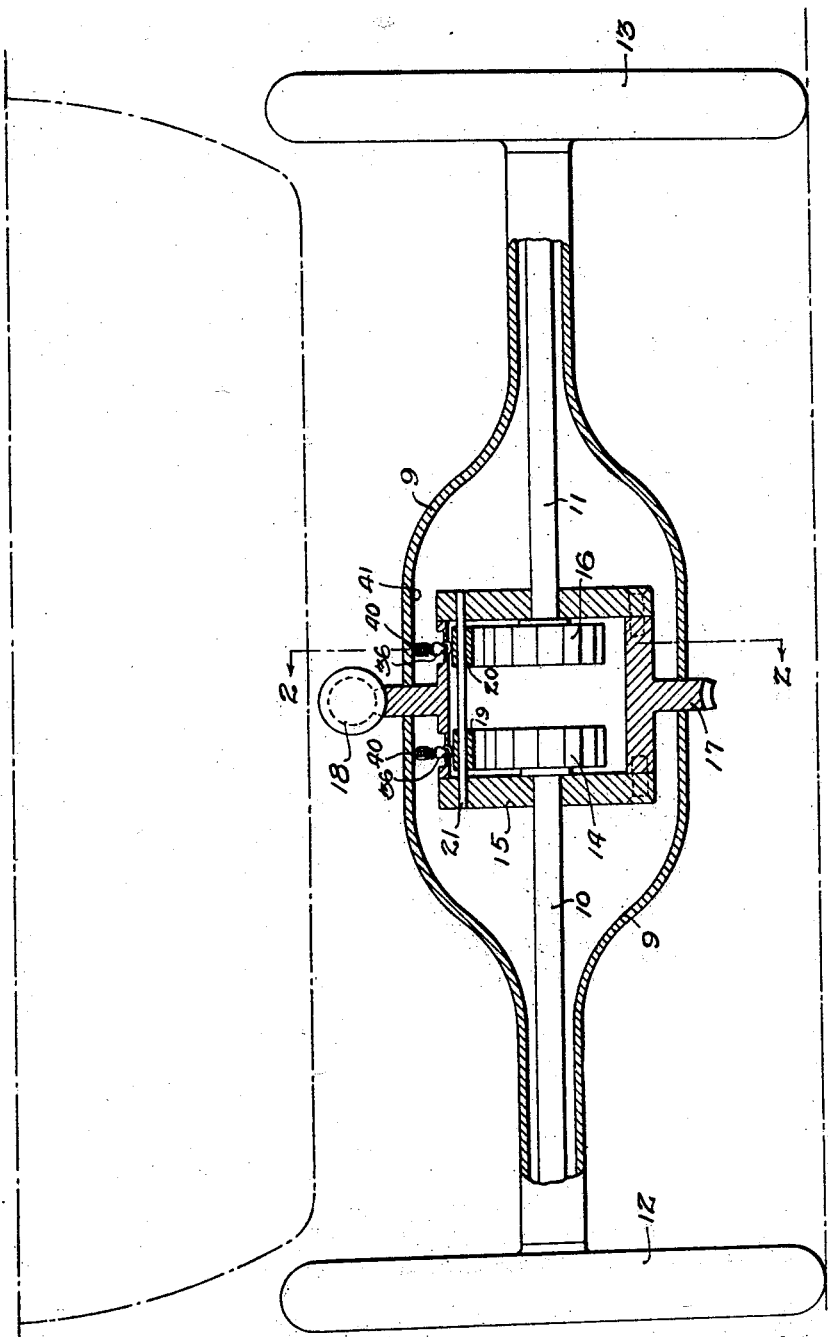

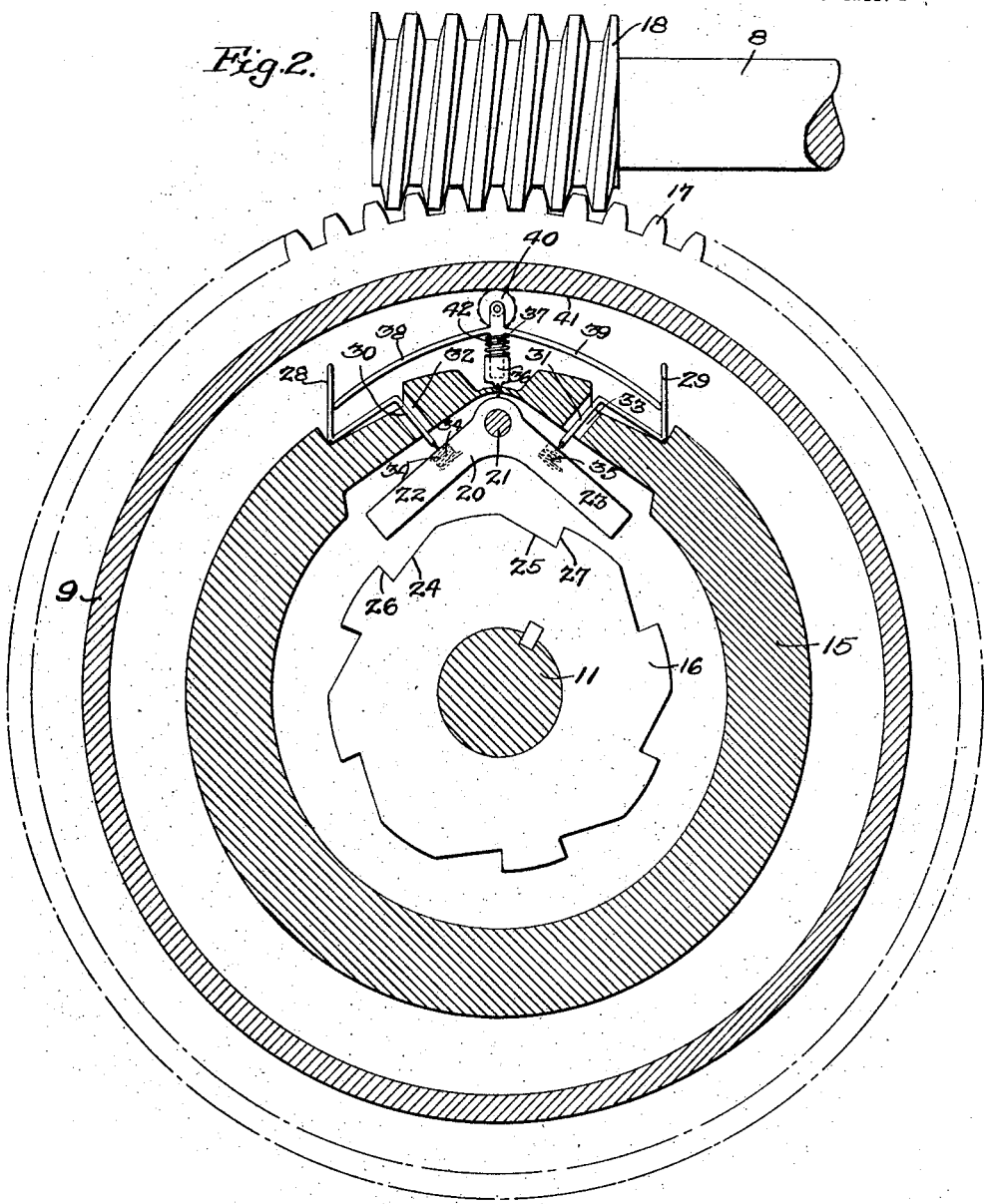

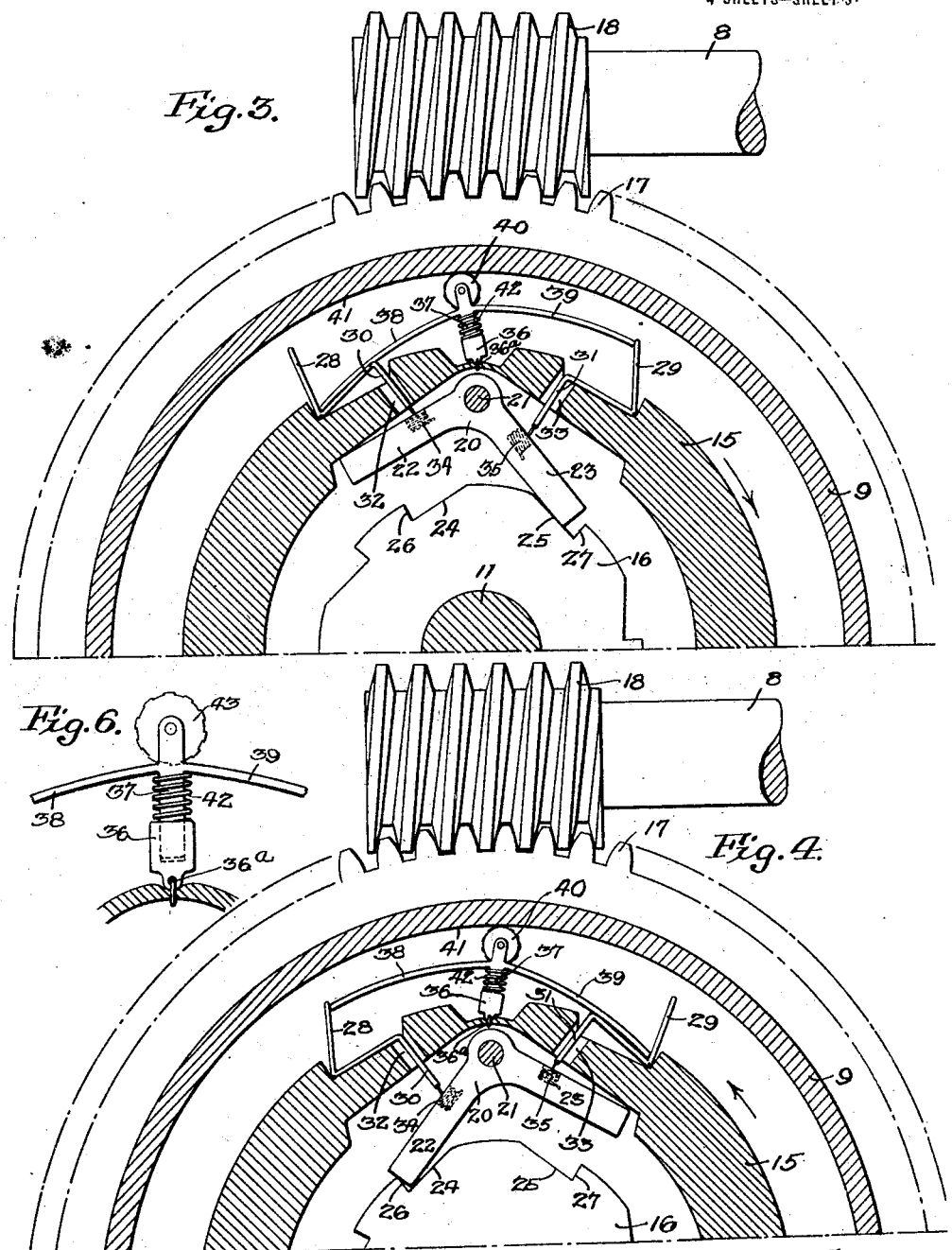

UNITED STATES PATENT OFFICE.

GEORGE W. MYERS, OF PHILADELPHIA, PENNSYLVANIA.

DIFFERENTIAL CLUTCH GEARING.

1,406,211.  Specification of Letters Patent.  Patented Feb. 14, 1922.

Application filed June 6, 1919, Serial No. 302,324. Renewed December 29, 1921. Serial No. 525,743.

*To all whom it may concern:*

Be it known that I, GEORGE W. MYERS, a citizen of the United States, residing at Philadelphia, in the county of Philadelphia and State of Pennsylvania, have invented certain new and useful Improvements in Differential Clutch Gearing, of which the following is a specification.

One object of my invention is to provide an improved clutch gearing of a simple construction which can be readily interposed between the drive shaft of an automobile and the rear wheels, whereby the rear wheels can be driven either forward or reverse and in which provision is made for difference of speed of the rear wheels when the automobile is making a turn.

This object, and other advantageous ends which will be described hereinafter, I attain in the following manner, reference being had to the accompanying drawings in which—

Figure 1 is a rear elevation, partly in section, showing my invention as applied to the rear wheels of an automobile; a part of the body of the automobile being indicated in dot-and-dash lines, Figure 2 is an enlarged section taken on the line 2—2 of Figure 1 showing the parts in a normal position, Figure 3 is a fragmentary section of the same character as shown in Figure 2 and showing the position of certain of the parts when the rear wheels are being driven straight ahead, Figure 4 is a view of similar nature to Figure 3 showing the position of said parts when the rear wheels are being driven in a reverse direction, Figure 5 is a view of the same as shown in Figures 2, 3 and 4 showing the position of the parts when the automobile is making a turn and indicating one series of elements in a position which they occupy when a clutch member on one axle section is running ahead of the speed of the engine to permit its wheel to travel in a greater arc than the wheel carried by the other section of the axle and which is driven by the engine, Figure 6 is a fragmentary elevation of certain of the parts and drawn on an enlarged scale, and Figure 7 is a diagrammatic plan view showing the position of the wheels when the automobile is making a turn, the right hand wheel running free and ahead of the engine as described in connection with Figure 5.

Referring to the drawings, 8 represents the engine driving shaft of an automobile and 9 represents a stationary housing for the rear axle sections 10 and 11, said axle sections respectively having the rear wheels 12 and 13 secured thereto. The axle section 10 has a ratchet wheel 14 secured thereto and adapted to freely rotate within a casing 15 in the form of a cylindrical drum. In similar manner the axle section 11 has a ratchet wheel 16 freely rotatable within the casing 15. The casing 15 has a worm wheel 17 projecting circumferentially therefrom, said worm wheel extending through the housing 9 and meshing with a worm 18 on the shaft 8. Thus the shaft 8 serves to rotate the casing 15 in either direction according to the direction of rotation of said shaft.

Two similarly constructed pawls 19 and 20 are freely pivoted on a rod 21 in the casing 15. Each of these pawls includes two arms 22 and 23 which are arranged at an angle to each other, as clearly shown in Figures 2 to 5 inclusive, and either of the arms of each pawl is adapted to be swung into engagement with its respective ratchet wheel. The ratchet wheels 14 and 16 have notches 24 and 25 which slant in opposite directions and respectively provide shoulders 26 and 27 against which the ends of the pawl arms 22 and 23 abut during the rotation of the casing 15 in opposite directions as will hereinafter be more fully described.

Bell-cranks 28 and 29 are pivotally connected to the casing 15 on the outside thereof and have portions 30 and 31 which extend through slots 32 and 33 in said casing and are attached to coiled springs 34 and 35. The springs 34 and 35 are secured to the arms 22 and 23 of the pawl 20, as clearly shown in Figures 2 to 5 inclusive. It will be understood that another set of bell-cranks 28 and 29 are secured to the arms of the pawl 19 in a manner above described in connection with the pawl 20.

Sleeves 36 are pivotally connected at 36ᵃ to the outer portions of the casing 15 and these sleeves are capable of being rocked, for example from the position shown in Figure 3 to the position shown in Figure 4. Bars 37 are slidably mounted within the sleeves 36 and have integral levers 38 and 39 projecting laterally therefrom. These levers are adapted to engage the bell-cranks 28 and 29 and rock them on their pivots. The upper ends of the bars 37 have rollers 40 pivoted thereon, said rollers being adapted to be pressed into engagement with the inner cylindrical surface 41 of the housing 9 by coiled springs 42 which surround the bars 37 and are interposed between the free ends of the sleeves 36 and the undersurfaces of the levers 38 and 39. The rollers 40 are preferably provided on their peripheral surfaces with projections 43 which are adapted to provide sufficient friction with the inner surface of the housing that when the casing is rotated, the bars 37 and sleeves 36 will be tilted or rocked so as to alternately cause the levers 38 and 39 to rock the bell-cranks 28 and 29 and thereby swing the arms 22 and 23 of the pawls 19 and 20 into engagement with the ratchet wheels so that the ratchet wheels will be driven in the direction of movement of the casing through the medium of the pawls.

Figure 2 shows the parts in a normal position with the pawl free of the ratchet wheel. Figure 3 shows the operation when the casing has started to rotate in the direction of the arrow, and the bell-crank 28 has been rocked, due to the engagement of the lever 38 therewith, to cause the pawl 20 to be swung so that its arm 23 moves into engagement with the ratchet wheel to rotate said ratchet wheel in the direction of said roller. Figure 4 shows the casing rotating in an opposite direction as indicated by the arrow, the lever 39 having moved the bell-crank 29 to swing the pawl so that its arm 22 engages the ratchet wheel to rotate the latter in the opposite direction. Figure 5 shows the condition of the elements when the ratchet wheel 16, due to its connection with the axle section 11 when the latter is running at a greater speed than the engine, such for example as when the wheel 13 as shown in Figure 7, is moving in the large arc 44 in making a turn; the wheel 12 operating in the small arc 45 and being driven by the engine through the medium of its ratchet 14 and pawl 19. It will be here noted that the ratchet wheel 16 while going at a greater speed than the casing 15 will push the arm 23 of the pawl out of its path and thus there will be no dragging action of the wheel 13 over the surface of the road bed. It will of course be understood that when the wheel 13 is turning in the small arc and the wheel 12 is turning in the large arc, such for example as when the automobile is being turned in an opposite direction, the wheel 12 will rotate freely and the wheel 13 will be driven directly in the same manner as above described in connection with the wheel 12.

Thus when driving straight ahead or reverse, the axle sections will be both driven through the medium of their pawls and when making a turn in either direction, the wheel making the large arc of the turn is free to rotate at a greater speed than the other wheel; said other wheel being driven by the engine.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination of a driving axle made in sections; a traction wheel on each section; a ratchet connected to each of said axle sections; independently mounted pawls for engagement with said ratchets; rotatable means to which said pawls are attached; common driving means; independently mounted members carried by said rotatable means and having a limited independent movement in opposite directions, said members having portions for engagement with said driving means; and means providing a resilient connection between said members and their respective pawls whereby the pawls will be moved in opposite directions into driving engagement with their ratchets upon said independent movement of said members in opposite directions; substantially as described.

2. The combination of a driving axle made in sections; a traction wheel on each section; a ratchet connected to each of said axle sections; independently mounted pawls for engagement with said ratchets; rotatable means to which said pawls are attached; common driving means; independently mounted members carried by said rotatable means and having a limited independent movement in opposite directions, said members having portions for engagement with said driving means; and means providing a resilient sliding connection between said members and their respective pawls whereby the pawls will be moved in opposite directions into driving engagement with their ratchets upon said independent movement of said members in opposite directions; substantially as described.

3. The combination of a driving axle made in sections; a traction wheel on each section; ratchets connected to said sections; pawls for engagement with said ratchets; rotatable means to which said pawls are attached; a fixed housing; sleeves rockably secured to said rotatable means; bars slidably mounted in said sleeves; rollers on said bars; springs for moving said bars outwardly to press said rollers in engagement with said housing, whereby said bars will be rocked when said rotatable means moves in opposite directions; means connected to said bars; and bell-cranks pivotally connected to said rotatable means and adapted to be moved by said means on the bars, said bell-cranks being operatively connected to said pawls, whereby when the bars are rocked, the pawls will be moved in opposite directions to engage the ratchets and thereby alternately rotate said ratchets in opposite directions; substantially as described.

4. The combination of a driving axle made in sections; a traction wheel on each section; ratchets connected to said sections; pawls for engagement with said ratchets; rotatable means to which said pawls are attached; a fixed housing; sleeves rockably secured to said rotatable means; bars slidably mounted in said sleeves; rollers on said bars; springs for moving said bars outwardly to press said rollers in engagement with said housing, whereby said bars will be rocked when said rotatable means moves in opposite directions; means connected to said bars; bell-cranks pivotally connected to said rotatable means and adapted to be moved by said means on the bars, said bell-cranks being operatively connected to said pawls, whereby when the bars are rocked, the pawls will be moved in opposite directions to engage the ratchets and thereby alternately rotate said ratchets in opposite directions; and springs interposed between said bell-cranks and the arms of said pawls, whereby either of said pawls can be moved out of engagement with the ratchets, due to the rotation of the ratchets at a speed greater than the speed of said rotatable means; substantially as described.

In testimony whereof I have signed my name to this specification in the presence of two subscribing witnesses.

GEORGE W. MYERS.

Witnesses:
SAMUEL LOGAN,
BENSON PHILLIPS.